UNITED STATES PATENT OFFICE.

GEORGE Y. SMITH, OF MINNEAPOLIS, MINNESOTA.

ARTIFICIAL FUEL.

SPECIFICATION forming part of Letters Patent No. 425,351, dated April 8, 1890.

Application filed February 15, 1890. Serial No. 340,632. (No specimens.)

*To all whom it may concern:*

Be it known that I, GEORGE Y. SMITH, a citizen of the United States, residing at Minneapolis, in the county of Hennepin and State of Minnesota, have invented certain new and useful Improvements in Composition for Artificial Fuel; and I do hereby declare the following to be a full, clear, and exact description of the invention, such as will enable others skilled in the art to which it appertains to make and use the same.

My invention relates to compounds for artificial fuel, and has for its object the production of a compound composed of highly-inflammable ingredients containing a large per cent. of carbon which will burn freely and without odor.

Heretofore many attempts have been made to produce artificial fuel compounds, and to some extent they have been successful; but in these prior attempts petroleum residuum or waste, which is rich in hydrocarbon, has been employed as one of the main ingredients of the composition, and during the combustion of the compound (which is usually molded into brick form) offensive odors due to the presence of this ingredient have arisen, causing great objection to its use. In my invention this obnoxious ingredient is dispensed with; but even otherwise the compound is believed to be novel.

The ingredients of my compound and the proportions in which they are combined are preferably as hereinafter described, although it is obvious that various changes in proportions could be adopted without departing from my invention, and that equivalents for the ingredients could be employed. Preferably the ingredients will be as follows and combined in the following proportions, viz: Peat, about twelve hundred pounds; comminuted coal or culm, six hundred pounds; rosin, about one hundred pounds; pitch, about one hundred pounds; rye-flour, about five pounds; lime, about five pounds. These ingredients are thoroughly intermixed and are then placed in a tank or vat heated by steam, where the pitch and rosin will be reduced to a fluid condition, and all the ingredients will be thoroughly intermixed and stirred together by revolving steam-heated paddles mounted on a shaft within the vat. The peat will be thoroughly cut up and disintegrated, and will be freed from all silica and other foreign matters before it is ready for use in the composition, and will be found to contain from seventy-five to eighty per cent. of carbon. Coal-dust or culm is also rich in carbon, and rosin and pitch are well-known inflammable materials also containing carbon. Rye-flour being rich in gluten acts as a binding or cementing ingredient, while the lime will correct any tendency toward acidity of the organic parts of the compound, thereby preventing fermentation, and will also act to harden the compound. After the ingredients have been thoroughly incoporated in the mixing-tank the compound is delivered therefrom to a machine for molding or pressing the material into the form of bricks or blocks, which will then be in readiness to be employed as fuel in any desired capacity. It is of course obvious that other kinds of fibrous material could be employed in lieu of peat; but as said ingredient is very rich in carbon it is preferably used.

Having thus described my invention, what I claim is—

A compound for the manufacture of artificial fuel, consisting of the following ingredients, combined in the proportions specified, viz: peat, about twelve hundred pounds; culm, about six hundred pounds; rosin, about one hundred pounds; pitch, about one hundred pounds; rye-flour, about five pounds; lime, about five pounds, substantially as and for the purpose specified.

In testimony whereof I affix my signature in presence of two witnesses.

GEORGE Y. SMITH.

Witnesses:
WM. H. BLODGETT,
FRANK D. MERCHANT.